May 26, 1925.
R. LIPPERT
HAM BOILER
Filed March 30, 1925
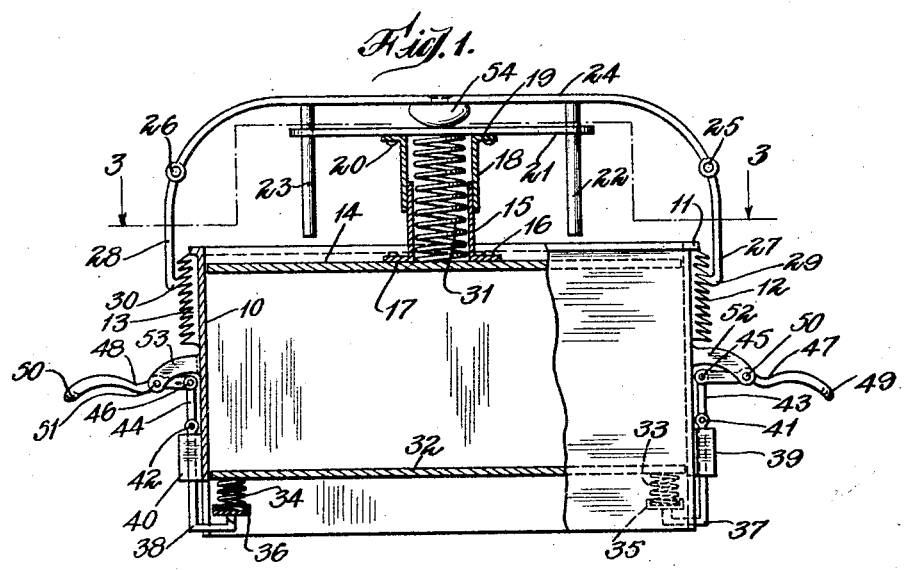
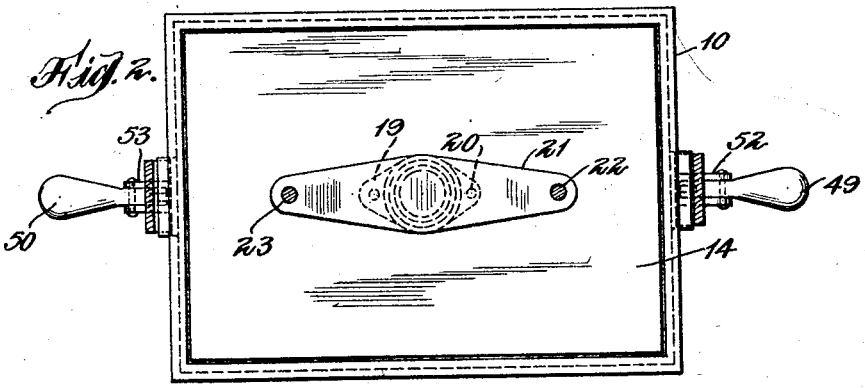
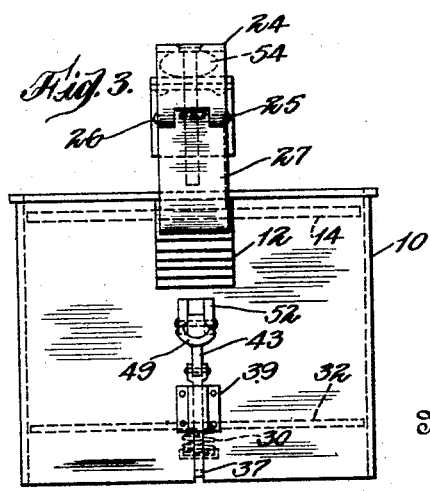
Inventor
Richard Lippert
By his Attorney
George C. Heinicke Patented May 26, 1925.

1,539,680

UNITED STATES PATENT OFFICE.

RICHARD LIPPERT, OF NEW YORK, N. Y.

HAM BOILER.

Application filed March 30, 1925. Serial No. 19,337.

*To all whom it may concern:*

Be it known that I, RICHARD LIPPERT, a citizen of Germany, and resident of New York, in the county of New York and State of New York, have invented certain new and useful Ham Boilers, of which the following is a specification.

The present invention relates to improvements in meat boilers, particularly ham boilers, and it is the principal object of the invention to provide a boiler in which the ham is subjected to pressure from the top as well as from the bottom, in order to subject the meat to a thoroughly uniform pressure and consequently obtaining a cooked ham of perfectly uniform consistence and not apt to crumble under the knife.

Another object of the invention is the provision of an improved ham boiler in which the meat during the cooking operation, is permanently under a uniform pressure from top and bottom and in fact, from all sides, for avoiding the necessity of subjecting the cooked ham to additional pressure after finish of the cooking process, and thus providing a novel and improved boiler resulting in a great saving in time and labor.

A further object of the invention is the provision of a ham boiler of comparatively simple and inexpensive construction yet positively and effectively operating to achieve the desired result.

A still further object of the invention is the provision of a ham boiler made of a stainless metal, in order to avoid oxidation, and for giving the boiler at all times a clean and hygienic appearance and thus saving time in cleaning and preparing the boiler for new operations.

These and other objects and advantages of my invention will become more fully apparent as the description thereof proceeds, and will then be more specifically defined in the appended claims.

In the accompanying drawing forming a material part of this disclosure:

Fig. 1 is a front elevation of a ham boiler constructed according to my invention, partly in section, and having its casing partly broken away to better disclose its interior construction.

Fig. 2 is a top plan view thereof, seen in the direction of the arrows 2—2 of Figure 1.

Fig. 3 is an end view of the boiler.

The boiler comprises a container 10 preferably made of stainless metal having an upper marginal flange 11, and racks 12 and 13 attached to or made integrally with its end walls.

Within the boiler a movable upper plate 14 is provided which has attached thereto at its upper face a socket 15 by means of bolts 16 passing through foot flange 17 of the socket.

A socket or sleeve 18 is telescoping with its lower end over the socket 17 and has its upper flange 19 secured by means of bolts or the like, 20, to a plate 21 guided near its outer end by means of rods or bars 22 and 23 attached to or made integrally at their upper ends with a handle 24 which has pivotally secured to its lower ends as at 25 and 26, securing levers 27 and 28, having hooked lower ends 29 and 30, adapted to engage the downwardly slanting teeth of the racks 12 and 13.

A strong spiral spring 31 is arranged within sockets 15 and 18, resting with its lower end upon plate 14 and engaging with its upper end the lower face of plate 21.

Another movable lower plate 32 is arranged near the bottom of container 10, spaced therefrom. Springs 33 and 34 rest with their lower ends in cups 35 and 36 while their upper ends are attached to the lower face of lower plate 32.

The cups 35 and 36 are carried by the inner ends of angular levers 37 and 38, extending to the outside of the cases, and guided at their upper outer ends through blocks 39 and 40 provided for this purpose in the end walls of the interior.

To the upper ends of levers 37 and 38, are pivotally secured, as at 41 and 42, links 43 and 44, to the upper ends of which are pivotally secured, as at 45 and 46, the inner ends of the operating levers 47 and 48 having outer end handles 49 and 50. These levers 47 and 48 are pivotally attached intermediate their ends, as at 50 and 51 to brackets 52 and 53, attached to the end walls of the container 10.

A conical body 54 is secured to the bail 24 and engages with its end face the upper face of plate 21 above spring 31.

The device operates as follows:

The boned and defatted ham is placed into the interior 10 above plate 32 and below plate 21. The upper movable plate 21 is then engaged with the ham by the proper operation of bail 24, which is depressed to a suitable degree, whereafter the parts are locked in their depressed positions by means of the engagement of the hooks 29 and 30 with the racks 12 and 13. Thereafter the lower plate 32 is pressed upwardly against the lower face of the ham and then locked in its adjusted position by the proper depression of handles 49 and 50.

The ham will thus be held under a uniform pressure throughout within the container and is then subjected to boiling in ordinary well-known manner.

It will be clear that the boiler may be made in any desired size to suit the various sizes of the hams, and that the improved apparatus will do away with the requirement of afterpressing in a foot press, or the like, as the ham is at all times under a perfectly uniform pressure in the boiler, thus resulting in an important saving in time and labor and extra apparatus by avoiding repeated boiling or other work necessary with the existing boilers of this type.

It is to be understood that the drawing and specification refer to the preferred form of my device and that the same is subject to many changes in its construction, such as fall within the scope of the appended claims without departure from the spirit of my invention.

Having thus described my invention, what I claim as new and desire to secure by Letters Patent is:—

1. In a ham boiler, a movable top plate, a means for depressing said top plate, a means for locking said top plate in its depressed position, and a movable bottom plate in said container, a pair of springs engaging said bottom plate, a pair of angular brackets, cups at their inner ends forming seats for said springs, a means for operating said movable bottom plate to press against the bottom of the ham in the container and a means for locking the parts in their adjusted pressure exerting positions.

2. In a ham boiler of the class described, the combination of an upper movable plate with a lower movable plate, a bail, rods depending from said bail, a pair of telescoping sockets on said plate and bail, a spring within said sockets, a plate against which the upper end of said spring engages, a conical body on said bail adapted to compress said spring, and a means on said bail for locking the upper plate in its pressure exerting position, and a means for pressing the lower plate against the bottom of the ham in said container and for locking the parts in their adjusted positions.

Signed at New York in the county of New York and State of New York.

RICHARD LIPPERT.